March 18, 1930.  E. C. DELSUC  1,751,397
COFFEE FILTER
Filed March 27, 1929
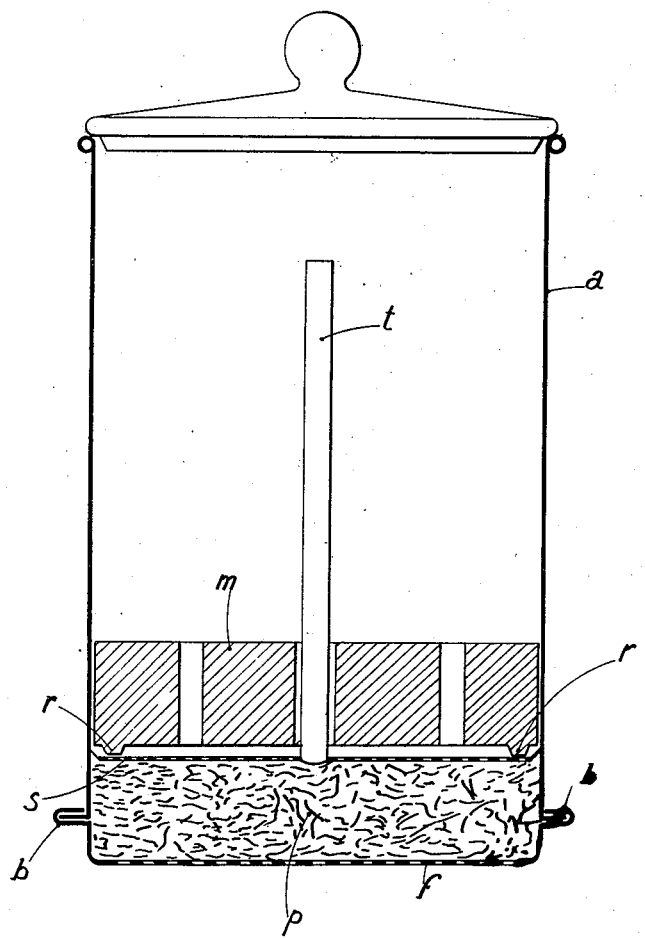
E. C. Delsuc
INVENTOR
By: Marks & Clerk
ATTYS.

Patented Mar. 18, 1930

1,751,397

UNITED STATES PATENT OFFICE

EMILE CAMILLE DELSUC, OF NANCY, FRANCE

COFFEE FILTER

Application filed March 27, 1929, Serial No. 350,407, and in Belgium March 29, 1928.

The present invention relates to improvements in coffee filtering devices of such nature as to afford, without any special precautions, a coffee liquid containing all the aromatic substances of the coffee in the same state as in the roasted coffee grain, thus offering a fine and agreeable aroma. It has been shown by various researches that the aroma of the coffee grain is due to a liquid which is unstable, even in the frozen state. This liquid will abruptly decompose at 80° C., thus affording other substances of a bitter taste, such as coffee usually exhibits. To provide a coffee without this bitter taste, the ground coffee must not be treated with water at a temperature above 80° C.

The present invention relates to a filter in which the boiling water will be lowered to a point below 80° before it makes contact with the coffee.

The apparatus consists essentially of a solid mass adapted to absorb the heat, which is disposed above the ground coffee, and is separated therefrom by a perforated plate, so that the boiling water poured into the filtering vessel will give up a part of its heat to the said mass before making contact with the coffee.

The accompanying drawing shows an embodiment of the invention.

The said filtering vessel comprises a main body $a$ of suitable shape, which is provided with a rib whereby it may fit upon the main coffee pot, not shown. The bottom of the vessel is perforated, and upon it is disposed the ground coffee $p$, upon which is laid a perforated plate mounted upon a central rod, or the like, so that it can be readily removed.

Upon the plate $s$ is disposed, permanently or not, the solid mass $m$ of material adapted to absorb the heat of the porcelain or other, as will be further described. Suitable projections $r$ are formed at the bottom of said mass $m$ to prevent it from stopping up the perforations in the plate $s$. The said mass may consist of an apertured thick disk, which fits into the body $a$ of the filter in order to serve as a guide for the plate $s$ and to hold it in place. The weight of the said mass assures a certain settling of the coffee, which is advantageous.

The dimensions of the mass are to be determined by the following considerations:

(1) Without exceeding 80°, the coffee should be prepared as hot as possible.

(2) In practice, the ground coffee will have given up all its aroma when it has been treated by an equal volume of water, and this first volume must not exceed 80° C. After this, the losses by radiation and by the parts of the filter or of the vessel, will prevent all excessive heating of the whole.

Neglecting the losses due to the walls of the filtering vessel, it is necessary, in order that this first volume of water shall not exceed 75° C., that the said mass shall have a heat capacity equal to one-half the volume of water which is to be thus cooled. The size of the mass will depend upon the specific heat of its substance.

If we designate as "specific calorific capacity" the specific heat with reference not to the weight but to the volume, and take as unity that of water, calculation shows that the specific calorific capacity is as follows for the different metals; nickel, 0.96, iron, copper, brass 0.8; aluminium, gold, porcelain, glass, marble, about 0.5.

If therefore the said mass consists of porcelain or aluminium, the mass should have a volume equal to that of the coffee, or about 100 cm³ for 40 grams of coffee.

The said mass may be of a composite nature, and may be homogeneous or not. It may be replaced by a water jacket. The aforesaid figures are not absolute, and due account must be taken of the composition of the body of the filter and of the body of the coffee pot. It is obvious that a filtering vessel of earthenware or porcelain will require a reduction of the volume of the mass $m$, since such a filtering vessel represents a considerable heat capacity.

Claims:

1. In a coffee filtering apparatus, a ground coffee receiving vessel having a perforated bottom, a perforated plate resting upon the ground coffee, a solid member disposed upon the said plate and having apertures for letting water pass through and having such a calorific capacity that boiling water poured into the vessel gives up a part of its heat before making contact with the coffee until its temperature is below 80°.

2. In a coffee filtering apparatus, a ground coffee receiving vessel having a perforated bottom, a perforated plate resting upon the ground coffee, a solid member disposed upon the said plate and having apertures for letting water pass through and having a calorific capacity equal to a quantity of water having half the volume of the ground coffee employed.

3. In a coffee filtering apparatus as claimed in claim 1, wherein the solid member is provided with projections on its lower surface for contact with the said perforated plate.

4. In a coffee filtering apparatus of the character described, in combination, a ground coffee receiving vessel having a filtering bottom, and a heat absorbing member arranged within the vessel and resting on the cup and having a diameter substantially equal to the diameter of the vessel and a thickness equal to the amount of ground coffee contained in the vessel.

5. An arrangement as claimed in claim 4 wherein a perforated plate is interposed between the coffee and the heat absorbing member and wherein the member is provided with apertures and also provided with projections acting to space the member from said plate.

In testimony whereof he has signed this specification.

EMILE CAMILLE DELSUC.